United States Patent [19]

Sakabe et al.

[11] 4,339,544

[45] Jul. 13, 1982

[54] CERAMIC DIELECTRIC COMPOSITION

[75] Inventors: Yukio Sakabe; Yukio Hamaji, both of Kyoto; Hiroshi Komatsu, Nagaokakyo, all of Japan

[73] Assignee: Murata Manufacturing Co., Ltd., Kyoto, Japan

[21] Appl. No.: 284,216

[22] Filed: Jul. 17, 1981

[30] Foreign Application Priority Data

Jul. 24, 1980 [JP] Japan ............................. 55-102213

[51] Int. Cl.$^3$ .................... C04B 35/00; C04B 35/46; H01B 3/12
[52] U.S. Cl. ................................ 501/136; 361/321; 501/134
[58] Field of Search ............................. 501/134, 136

[56] References Cited

U.S. PATENT DOCUMENTS 4,265,668  5/1981  Fujiwara et al. ............... 501/136 X

FOREIGN PATENT DOCUMENTS 52-10744  1/1977  Japan ................................. 501/134
666154  6/1979  U.S.S.R. ............................. 501/134

Primary Examiner—Helen M. McCarthy
Attorney, Agent, or Firm—Birch, Stewart, Kolasch & Birch

[57] ABSTRACT

A ceramic dielectric composition of a ternary system $Pb(Mg_{\frac{1}{3}}Nb_{\frac{2}{3}})O_3$-$Pb(Zn_{\frac{1}{3}}Nb_{\frac{2}{3}})O_3$-$PbTiO_3$, comprising 69.05–69.60% by weight of $Pb_3O_4$, 2.41–4.00% by weight of MgO, 0.08–3.15% by weight of ZnO, 24.01–26.66% by weight of $Nb_2O_5$ and 0.13–2.59% by weight of $TiO_2$. The composition can be sintered at a low firing temperature less than 1,150° C., and has a high dielectric constant above 10,000.

2 Claims, 1 Drawing Figure

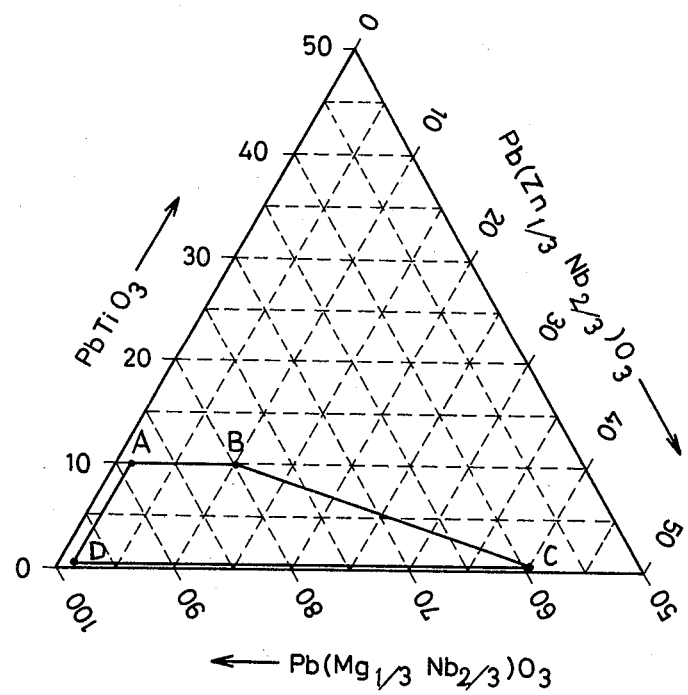

CERAMIC DIELECTRIC COMPOSITION

BACKGROUND OF THE INVENTION

1. Field of the Invention

This invention relates to a ceramic dielectric composition which has a high dielectric constant above 10,000 and which can be sintered at a temperature below 1,150° C.

2. Description of the Prior Art

Up to this time, compositions, comprising $BaTiO_3$ as a base raw material and additives such as $CaTiO_3$, $BaSnO_3$, $CaZrO_3$, $SrTiO_3$ and the like, have been used as dielectric materials for ceramic capacitors with a high dielectric constant. These materials have a relatively high dielectric constant to the extent of 2,000-25,000. However, these composition systems must be fired at high temperature to the extent of 1,300°-1,400° C. Therefore, while the cost of the firing becomes expensive, further problems have been encountered as follows.

Multilayer ceramic capacitors composed of these $BaTiO_3$ systems should be fired at a high temperature above 1,300° C. An internal electrode of these capacitors is fired with dielectric materials. Accordingly, noble metals having melting points higher than 1,300° C., such as platinum or palladium, must be used for the electrode material as not to cause a reaction with the dielectrics or oxidation even at such high temperature. In another approach, compositions based by $BaTiO_3$ are modified by the addition of some oxides having low melting points in order to lower the firing temperature below 1,150° C. However, such compositions have dielectric constants of 3,000 at the highest. So far as such compositions are concerned, compositions which have dielectric constants above 10,000 have not been obtained.

SUMMARY OF THE INVENTION

It is an object of the invention to provide a ceramic dielectric composition which can be fired at a temperature below 1,150° C. and which has a high dielectric constant to the extent of 10,000 or more.

The invention provides a ceramic dielectric composition of a ternary system $Pb(Mg_{1/3}Nb_{2/3})O_3$-$Pb(Zn_{1/3}Nb_{2/3})O_3$-$PbTiO_3$ which comprises 68.05-69.60% by weight of $Pb_3O_4$, 2.41-4.00% by weight of MgO, 0.08-3.15% by weight of ZnO, 24.01-26.66% by weight of $Nb_2O_5$ and 0.13-2.59% by weight of $TiO_2$. The percentages by weight of the composition, $[Pb(Mg_{1/3}Nb_{2/3})O_3$, $Pb(Zn_{1/3}Nb_{2/3})O_3$, $PbTiO_3]$, fall within the region enclosed by the lines joining four points of A(89.0, 1.0, 10.0), B(80.0, 10.0, 10.0), C(59.5, 40.0, 0.5) and D(98.5, 1.0, 0.5) in a diagram identified as FIG. 1 showing the ternary system.

By means of this invention, the above described shortcomings of the prior art are overcome. More specifically, by means of the ceramic dielectric composition in accordance with the invention, a capacitor of small size and of large capacitance may be obtained. Furthermore, the firing cost may be reduced. In a multilayer capacitor, since relatively inexpensive metal such as the silver or the like may be used as internal electrode material, the product cost of such a capacitor can be reduced.

Other objects and advantages of this invention will further become apparent hereinafter.

BRIEF DESCRIPTION OF THE DRAWING

The single diagram in the accompanying drawing (FIG. 1) shows the composition region of the ternary system ceramic compositions in accordance with the present invention.

DESCRIPTION OF THE PREFERRED EMBODIMENTS

This invention provides a ternary system ceramic dielectric composition with a high dielectric constant, which essentially consists of a solid solution of $Pb(Mg_{1/3}Nb_{2/3})O_3$-$Pb(Zn_{1/3}Nb_{2/3})O_3$-$PbTiO_3$. The preferred composition proportion of the individual oxides will be determined on the basis of the embodiments described below.

First, a table is provided for reference in the description with respect to the following embodiments. In this table, various composition examples of ceramic dielectric compositions, firing conditions and electric characteristics are shown therein.

TABLE

| Sample No. | Mixing Proportion [wt %] | | | Proportion of Basic Oxides [wt %] | | | | | Firing Temperature [°C.] | Dielectric Constant at 25° C. | tan δ [%] at 25° C. |
| --- | --- | --- | --- | --- | --- | --- | --- | --- | --- | --- | --- |
| | X | Y | Z | $Pb_3O_4$ | MgO | ZnO | $Nb_2O_5$ | $TiO_2$ | | | |
| *1 | 100 | 0 | 0 | 69.14 | 4.06 | 0 | 26.80 | 0 | 1080 | 5700 | 0.32 |
| 2 | 98.5 | 1.0 | 0.5 | 69.13 | 4.00 | 0.08 | 26.66 | 0.13 | 1080 | 10300 | 0.30 |
| 3 | 89.0 | 1.0 | 10.0 | 69.60 | 3.62 | 0.08 | 24.11 | 2.59 | 1140 | 18200 | 1.46 |
| 4 | 89.5 | 10.0 | 0.5 | 68.89 | 3.64 | 0.78 | 26.56 | 0.13 | 1080 | 13600 | 0.40 |
| *5 | 80.0 | 5.0 | 15.0 | 69.75 | 3.25 | 0.39 | 22.73 | 3.88 | 1180 | 6100 | 4.80 |
| 6 | 80.0 | 10.0 | 10.0 | 69.36 | 3.25 | 0.78 | 24.02 | 2.59 | 1050 | 14800 | 2.70 |
| 7 | 80.0 | 15.0 | 5.0 | 68.97 | 3.25 | 1.18 | 25.31 | 1.29 | 1050 | 13000 | 1.24 |
| 8 | 73.0 | 25.0 | 2.0 | 68.55 | 2.96 | 1.97 | 26.00 | 0.52 | 1050 | 11400 | 0.80 |
| *9 | 65.0 | 17.5 | 17.5 | 69.53 | 2.64 | 1.37 | 21.93 | 4.53 | 1200 | 4000 | 5.20 |
| *10 | 65.0 | 25.0 | 10.0 | 68.96 | 2.64 | 1.97 | 23.87 | 2.56 | 1150 | 2930 | 4.70 |
| 11 | 59.5 | 40.0 | 0.5 | 68.06 | 2.41 | 3.15 | 26.25 | 0.13 | 1030 | 12500 | 2.70 |
| *12 | 55.0 | 40.0 | 5.0 | 68.29 | 2.23 | 3.15 | 25.04 | 1.29 | 1030 | 7900 | 4.90 |

X: $Pb(Mg_{1/3}Nb_{2/3})O_3$,
Y: $Pb(Zn_{1/3}Nb_{2/3})O_3$,
Z: $PbTiO_3$

These samples were prepared as follows.

As raw materials, $Pb_3O_4$, MgO, ZnO, $Nb_2O_5$ and $TiO_2$ were prepared. Then, these raw materials were weighed and previously mixed to obtain compounds such as $Pb(Mg_{1/3}Nb_{2/3})O_3$, $Pb(Zn_{1/3}Nb_{2/3})O_3$ and $PbTiO_3$, respectively. Then, these oxide mixtures were calcined at a temperature ranging from 850° C. to 950° C. for two hours. As a result, three calcined mixtures were crushed to powder, and the three kinds of mixtures (X, Y and Z) were mixed with each other in accordance with the respective desired mixing proportions shown in the table. Then, a binding agent such as polyvinylacetate was added 3% by weight into the respective mixtures, and these mixtures were milled by a wet process. Subsequently, the mixtures were dried and powdered by a granulation process. These mixtures were formed into discs of 12 mm in diameter and 1.5 mm in thickness under pressure of 1 ton/cm$^2$. These discs were fired at the respective temperatures shown in the column "Firing Temperature" of the table by an electric furnace. Samples for measurements of dielectric characteristics were prepared by applying silver paste as electrodes on both surfaces of the discs and fired at 800° C.

The dielectric constant ($\epsilon$) and the dielectric loss (tan $\delta$) of each sample were measured and the results are shown in the table. In addition, the dielectric constant and the dielectric loss is measured at 25° C.

In the table, the samples of Nos. 1, 5, 9, 10 and 12 are beyond the scope of the present invention.

The accompanying diagram shows the composition region of the present invention. In this diagram, with respect to the mixing proportion of [Pb(Mg$_{1/3}$Nb$_{2/3}$)O$_3$, Pb(Zn$_{1/3}$Nb$_{2/3}$)O$_3$, PbTiO$_3$], the region enclosed with lines joining four points, that is, the points of A(89.0, 1.0, 10.0), B(80.0, 10.0, 10.0), C(59.5, 40.0, 0.5) and D(98.5, 1.0, 0.5) corresponds to the mixing proportions within the scope of the present invention.

On the basis of the data shown in the table, the proportions of compositions of individual basic oxides to be included in the present ceramic dielectric composition (weight %) may be determined as follows:

| | |
|---|---|
| Pb$_3$O$_4$ | 68.05–69.60 |
| MgO | 2.41– 4.00 |
| ZnO | 0.08– 3.15 |
| Nb$_2$O$_5$ | 24.01–26.66 |
| TiO$_2$ | 0.13– 2.59 |

In each composition in the proportion of the oxides as shown above, the samples, such as No. 1, wherein MgO is increased beyond 4.00, ZnO is decreased below 0.08, Nb$_2$O$_5$ is increased beyond 26.66 or TiO$_2$ is decreased below 0.13, deviate from the scope of the present invention. The dielectric constants are decreased considerably below 10,000 and, therefore, the compositions are not suitable for high dielectric constant capacitors.

The samples, such as No. 5, wherein Pb$_3$O$_4$ is increased beyond 69.60, Nb$_2$O$_5$ is decreased below 24.01 or TiO$_2$ is increased beyond 2.59, also deviate from the scope of the present invention and undesirably invite the rise of the firing temperature and the decrease of the dielectric constant.

The samples, such as No. 9, wherein Nb$_2$O$_5$ is decreased below 24.01, or TiO$_2$ is increased beyond 2.59, deviate from the scope of the present invention and undesirably invite the rise of the firing temperature and the decrease of the dielectric constant.

The samples, such as No. 10, wherein Nb$_2$O$_5$ is decreased below 24.01, are not preferred in that the dielectric constant is extremely low.

The samples, such as No. 12, wherein MgO is decreased below 2.41, deviate from the scope of the present invention and undesirably have a low dielectric constant.

All the samples of Nos. 5, 9, 10 and 12, which are out of the scope of the present invention, undesirably have a dielectric loss over 3%.

The samples of Nos. 2–4, 6–8 and 11 which are within the scope of the present invention have dielectric constants beyond 10,000, a dielectric loss below 3%, and can be sintered at a temperature of 1,000°–1,150° C. Accordingly, it is clear that the compositions within the scope of the present invention have excellent properties of dielectric materials for ceramic capacitors with large capacitance.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A ceramic dielectric composition of a ternary system Pb(Mg$_{1/3}$Nb$_{2/3}$)O$_3$-Pb(Zn$_{1/3}$Nb$_{2/3}$)O$_3$-PbTiO$_3$, comprising:
68.05–69.60% by weight of Pb$_3$O$_4$;
2.41–4.00% by weight of MgO;
0.08–3.15% by weight of ZnO;
24.01–26.66% by weight of Nb$_2$O$_5$; and
0.13–2.59% by weight of TiO$_2$; and
the percentages by weight of said composition, [Pb(Mg$_{1/3}$Nb$_{2/3}$)O$_3$, Pb(Zn$_{1/3}$Nb$_{2/3}$)O$_3$, PbTiO$_3$], falling within the region enclosed by the lines joining four points of A(89.0, 1.0, 10.0), B(80.0, 10.0, 10.0), C(59.5, 40.0, 0.5) and D(98.5, 1.0, 0.5) in a diagram showing the proportions of the ternary system.

2. A high capacitance capacitor including a ceramic dielectric composition of a ternary system Pb(Mg$_{1/3}$Nb$_{2/3}$)O$_3$-Pb(Zn$_{1/3}$Nb$_{2/3}$)O$_3$-PbTiO$_3$ which can be fired at a temperature below 1,150° C. and which has a dielectric constant of at least 10,000, said composition comprising:
68.05–69.60% by weight of Pb$_3$O$_4$;
2.41–4.00% by weight of MgO;
0.08–3.15% by weight of ZnO;
24.01–26.66% by weight of Nb$_2$O$_5$; and
0.13–2.59% by weight of TiO$_2$; and
the percentages by weight of said composition, [Pb(Mg$_{1/3}$Nb$_{2/3}$)O$_3$, Pb(Zn$_{1/3}$Nb$_{2/3}$)O$_3$, PbTiO$_3$], falling within the region enclosed by the lines joining four points of A(89.0, 1.0, 10.0), B(80.0, 10.0, 10.0), C(59.5, 40.0, 0.5) and D(98.5, 1.0, 0.5) in a diagram showing the proportions of the ternary system.

* * * * *